US009896995B2

(12) United States Patent
Koyanagi et al.

(10) Patent No.: US 9,896,995 B2
(45) Date of Patent: Feb. 20, 2018

(54) LUBRICANT FEED MECHANISM FOR TURBOCHARGER (71) Applicant: Taiho Kogyo Co., Ltd., Toyota-shi, Aichi (JP)

(72) Inventors: Masaaki Koyanagi, Toyota (JP); Maki Aoki, Toyota (JP); Satoru Kanbara, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 191 days.

(21) Appl. No.: 14/774,316

(22) PCT Filed: Feb. 27, 2014

(86) PCT No.: PCT/JP2014/054801
§ 371 (c)(1),
(2) Date: Sep. 10, 2015

(87) PCT Pub. No.: WO2014/141886
PCT Pub. Date: Sep. 18, 2014

(65) Prior Publication Data
US 2016/0040591 A1    Feb. 11, 2016

(30) Foreign Application Priority Data

Mar. 12, 2013  (JP) .................. 2013-049707
Dec. 6, 2013   (JP) .................. 2013-252795

(51) Int. Cl.
*F02B 39/14*    (2006.01)
*F02B 39/00*    (2006.01)
(Continued)

(52) U.S. Cl.
CPC .............. *F02B 39/14* (2013.01); *F01D 25/16* (2013.01); *F01D 25/166* (2013.01); *F01D 25/18* (2013.01);
(Continued)

(58) Field of Classification Search
CPC .......... F02B 39/14; F02B 33/40; F01D 25/16; F01D 25/166; F01D 25/18; F01D 25/20;
(Continued)

(56) References Cited

U.S. PATENT DOCUMENTS 3,057,436 A     10/1962  Jacobson et al.
4,058,981 A *   11/1977  Henson .................... F01M 1/02
                                                      184/6.3
2013/0136579 A1* 5/2013  Koch ...................... F01D 25/18
                                                      415/115

FOREIGN PATENT DOCUMENTS

DE    942234 C      4/1956
FR    2353707 A1    12/1977
(Continued)

OTHER PUBLICATIONS

Office Action (Notice of Reasons for Refusal) dated Jan. 17, 2017 by the Japanese Patent Office in Japanese Patent Application No. 2013-252795, and an English Translation of the Office Action. (8 pages).

(Continued)

*Primary Examiner* — Mary A Davis
*Assistant Examiner* — Kelsey Stanek
(74) *Attorney, Agent, or Firm* — Buchanan Ingersoll & Rooney PC (57) ABSTRACT Provided is a lubricant feed mechanism for a turbocharger, the mechanism that can reduce work of an oil pump while preventing an excessive supply of lubricant to a bearing part. The lubricant feed mechanism for a turbocharger, the mechanism of feeding lubricant to a bearing part that rotatably supports a shaft connecting a compressor wheel and a turbine wheel, includes: an oil supply passage that guides the lubricant fed under pressure from the oil pump to the bearing part; and a flow control valve provided to the oil supply passage for adjusting the amount of the lubricant by (Continued)

throttling the flow passage of the lubricant based on a pressure of the lubricant flowing through the oil supply passage.

1 Claim, 11 Drawing Sheets (51) Int. Cl.
*F01D 25/16* (2006.01)
*F01D 25/18* (2006.01)
*F01M 1/16* (2006.01)
*F01D 25/20* (2006.01)
*F02B 33/40* (2006.01)
*F16C 33/10* (2006.01)

(52) U.S. Cl.
CPC .............. *F01D 25/20* (2013.01); *F01M 1/16* (2013.01); *F02B 33/40* (2013.01); *F05D 2220/40* (2013.01); *F05D 2260/98* (2013.01); *F16C 33/1045* (2013.01); *F16C 2360/24* (2013.01); *F16N 2210/14* (2013.01)

(58) Field of Classification Search
CPC ... F01M 1/16; F05D 2260/98; F05D 2220/40; F16C 33/1045; F16C 2360/24; F16N 2210/14

USPC .................................................. 415/111, 115
See application file for complete search history.

(56) References Cited

FOREIGN PATENT DOCUMENTS

| | | |
|---|---|---|
| JP | 03000910 A | 1/1991 |
| JP | 4-30230 | 3/1992 |
| JP | 8-93490 A | 4/1996 |
| JP | 2010169066 A | 8/2010 |
| WO | WO 2012/021362 A2 | 2/2012 |

OTHER PUBLICATIONS

Office Action (Notice of Reasons for Rejection) dated Sep. 27, 2016, by the Japanese Patent Office in Japanese Patent Application No. 2013-252795, and an English Translation of the Office Action. (7 pages).

International Search Report (PCT/ISA/210) dated Apr. 8, 2014, by the Japanese Patent Office as the International Searching Authority for International Application No. PCT/JP2014/054801.

Extended European Search Report dated Sep. 26, 2016, issued by the European Patent Office in corresponding European Application No. 14763861.3-1606 (5 pages).

* cited by examiner

PRIOR ART

LUBRICANT FEED MECHANISM FOR TURBOCHARGER

TECHNICAL FIELD

The present invention relates to the techniques of a lubricant feed mechanism for a turbocharger, the mechanism of feeding lubricant to a bearing part that rotatably supports a shaft connecting a compressor wheel and a turbine wheel.

BACKGROUND ART

The techniques of lubricant feed mechanisms for turbochargers that feed lubricant to a bearing part that rotatably supports a shaft connecting a compressor wheel and a turbine wheel have hitherto been known. For example, the technique is described in Patent Literature 1.

Figure 6:
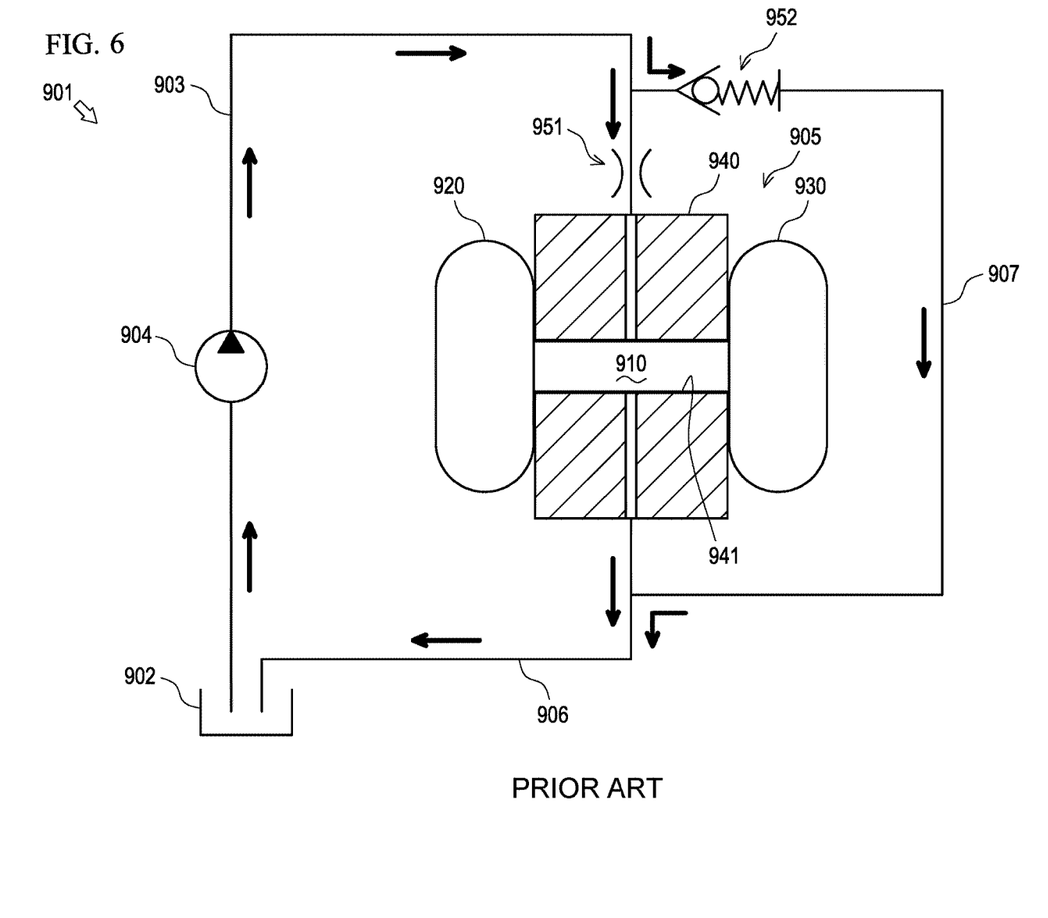
FIG. 6 is a schematic diagram illustrating the overall structure of a conventional lubricant feed mechanism.

Patent Literature 1 describes a lubricant feed mechanism 901 for a turbocharger 905 as shown in FIG. 6. In this lubricant feed mechanism 901, lubricant stored in an oil pan 902 is fed to a bearing housing 940 of the turbocharger 905 by an oil pump 904 via a forced feed oil passage 903.

The lubricant fed to the bearing housing 940 is guided to a bearing part 941 that rotatably supports a shaft 910 connecting a compressor wheel 920 and a turbine wheel 930 to lubricate the bearing part 941. After lubricating the bearing part 941, the lubricant is returned to the oil pan 902 via a return oil passage 906.

In this lubricant feed mechanism 901, a throttle 951 is provided in the forced feed oil passage 903. Further provided is a drain oil passage 907 that connects the forced feed oil passage 903 (more particularly, the upstream side of the throttle 951 in the forced feed oil passage 903) and the return oil passage 906 so as to bypass the bearing housing 940, and a pressure adjusting valve 952 is provided in this drain oil passage 907.

In the lubricant feed mechanism 901 configured as described above, the throttle 951 ensures that a minimum necessary amount of lubricant is fed to the bearing part 941, and the pressure adjusting valve 952 prevents an excessive supply of lubricant to the bearing part 941. Specifically, when the discharge pressure of the oil pump 904 rises (and in turn the pressure in the forced feed oil passage 903 rises), the pressure adjusting valve 952 opens to release the lubricant in the forced feed oil passage 903 into the drain oil passage 907, whereby the pressure in the forced feed oil passage 903 is adjusted not to exceed a predetermined level. In this way, the lubricant can be prevented from being fed excessively to the bearing housing 940.

One disadvantage of such a lubricant feed mechanism 901 is that some amount of work done by the oil pump 904 is wasted because the oil pump 904 feeds a large amount of lubricant under pressure that includes not only the lubricant to be fed to the bearing housing 940 but also the lubricant that is to be released via the pressure adjusting valve 952.

CITATION LIST

Patent Literature

Patent Literature 1: Japanese Patent Application Laid-open No. 8-93490

SUMMARY OF INVENTION

Technical Problem

The present invention has been made in view of the circumstances described above, and the object thereof is to provide a lubricant feed mechanism for a turbocharger that can reduce work of an oil pump while preventing an excessive supply of lubricant to a bearing part.

Solution to Problem

The problem to be solved by the present invention is as noted above, and the solution to the problem will be described next.

That is, a lubricant feed mechanism for a turbocharger according to the present invention, the mechanism of feeding lubricant to a bearing part that rotatably supports a shaft connecting a compressor wheel and a turbine wheel, includes: an oil supply passage that guides the lubricant fed under pressure from an oil pump to the bearing part, and a flow control valve provided to the oil supply passage for adjusting an amount of the lubricant by throttling a flow passage of the lubricant based on a pressure of the lubricant flowing through the oil supply passage.

In the lubricant feed mechanism for a turbocharger of the present invention, the flow control valve is provided in a bearing housing where the bearing part is formed.

Advantageous Effects of Invention

The present invention provides such effects as described below.

With the lubricant feed mechanism for a turbocharger of the present invention, an excessive supply of lubricant to the bearing part can be prevented without the need to release the lubricant, so that work of the oil pump can be reduced. This enables a reduction in the size of the oil pump.

With the lubricant feed mechanism for a turbocharger of the present invention, the flow control valve can be handled integrally with the bearing housing. This allows for space saving and facilitates assembling work.

DESCRIPTION OF EMBODIMENTS

Hereinafter, the up-down direction, front-back direction, and right-left direction are defined as indicated by the arrows in the drawings.

First, the overall structure of a lubricant feed mechanism 1 according to one embodiment of the present invention will be generally described with reference to FIG. 1.

The lubricant feed mechanism 1 is a mechanism for feeding lubricant to a bearing part 41 in a turbocharger 5 that is to be described later. The lubricant feed mechanism 1 is generally made up of an oil pan 2, a forced feed oil passage 3, an oil pump 4, the turbocharger 5 (more particularly, parts of the turbocharger 5 that form a path for the lubricant to pass through), and a return oil passage 6.

The oil pan 2 is a reservoir of the lubricant provided in an engine that is not shown. One end of one forced feed oil passage 3 is connected to the oil pan 2. The other end of the forced feed oil passage 3 is connected to the turbocharger 5 (more particularly, to an oil supply passage 42 in a bearing housing 40 to be described later). The oil pump 4 that is driven in accordance with the rotation of the engine is provided in a midway portion of the forced feed oil passage 3.

In the turbocharger 5, a compressor wheel 20 and a turbine wheel 30 are connected to each other via a shaft 10. This shaft 10 is rotatably supported by the bearing part 41 of the bearing housing 40.

In the bearing housing 40 are formed the oil supply passage 42 and an oil discharge passage 43. One end (outer end) of the oil supply passage 42 is connected to the other end of the forced feed oil passage 3 as mentioned above, while the other end (inner end) of the oil supply passage 42 is connected to the bearing part 41. A flow control valve 50 is provided in a midway portion of the oil supply passage 42. One end (inner end) of the oil discharge passage 43 is connected to the bearing part 41, while the other end (outer end) of the oil discharge passage 43 is connected to one end of the return oil passage 6. The other end of this return oil passage 6 is connected to the oil pan 2.

In the lubricant feed mechanism 1 configured as described above, when the oil pump 4 is driven by the rotation of the engine, the lubricant in the oil pan 2 is fed under pressure by the oil pump 4 via the forced feed oil passage 3 to the turbocharger 5. The lubricant is guided to the bearing part 41 of the bearing housing 40 via the oil supply passage 42, with its flow amount being suitably adjusted by the flow control valve 50. After lubricating the bearing part 41, the lubricant is returned to the oil pan 2 via the oil discharge passage 43 and return oil passage 6.

Although not specifically mentioned in this embodiment, the lubricant that is fed under pressure by the oil pump 4 is also fed to various parts of the engine via other oil passages (not shown) to lubricate the various parts of the engine as required.

Next, the structure of the turbocharger 5 will be described with reference to FIG. 2 and FIG. 3.

The turbocharger 5 is a device for feeding compressed air into cylinders of the engine. The turbocharger 5 generally includes the shaft 10, compressor wheel 20, turbine wheel 30, bearing housing 40, flow control valve 50, sliding bearings 60, a thrust collar 70, and a thrust bearing 90.

The shaft 10 connects the compressor wheel 20 and the turbine wheel 30 to be described later. The shaft 10 is disposed such that its longitudinal direction (axial direction) coincides with the front-back direction.

The compressor wheel 20 has a plurality of blades to compress the air by being driven to rotate. The compressor wheel 20 is fixed to a rear end of the shaft 10.

The turbine wheel 30 has a plurality of blades and is rotated by exhaust gas from the engine to generate a drive force. The turbine wheel 30 is integrally formed at a front end of the shaft 10.

The bearing housing 40 is a substantially box-like member that indirectly and rotatably supports the shaft 10. In the bearing housing 40 are formed the bearing part 41, oil supply passage 42, and oil discharge passage 43.

The bearing part 41 is a part that indirectly and rotatably supports the shaft 10. The bearing part 41 has a circular cross section and extends through the bearing housing 40 in the front-back direction.

The oil supply passage 42 is a passage for guiding the lubricant that is fed under pressure by the oil pump 4 to the bearing part 41. The oil supply passage 42 is formed upward from a lower surface of the bearing housing 40. One end (lower end) of the oil supply passage 42 is connected to the other end of the forced feed oil passage 3 (see FIG. 1). The other end (upper end) of the oil supply passage 42 is split to the front and back and the respective split ends are connected to a front end and a rear end of the bearing part 41.

The flow control valve 50 to be described later is provided in a midway portion of the oil supply passage 42. For convenience of explanation, hereinafter, part of the oil supply passage 42 from one end (lower end) to the flow control valve 50, and part of the oil supply passage 42 from the flow control valve 50 to the other end (upper end), will be referred to as a first oil supply passage 42a and a second oil supply passage 42b, respectively.

The oil discharge passage 43 is a passage for discharging the lubricant from the bearing part 41. The oil discharge passage 43 is formed upward from a lower surface of the bearing housing 40. One end (upper end) of the oil discharge passage 43 is split as required, and the respective split ends are connected to a front end, a rear end, and a midway portion between front and back of the bearing part 41. The other end (lower end) of the oil discharge passage 43 is connected to one end of the return oil passage 6 (see FIG. 1).

The flow control valve 50 adjusts the flow amount of the lubricant by throttling the flow passage of the lubricant based on the pressure of the lubricant flowing through the oil supply passage 42. The flow control valve 50 is provided in a midway portion of the oil supply passage 42. The flow control valve 50 is disposed such that its longitudinal direction (axial direction) coincides with the right-left direction.

The structure of the flow control valve 50 will be described in more detail later.

The sliding bearings 60 are substantially cylindrical bearings that rotatably support the shaft 10. The respective sliding bearings 60 are disposed at the front end and rear end (parts opposite the second oil supply passage 42b) of the bearing part 41 in the bearing housing 40. The shaft 10 is inserted through the sliding bearings 60.

The thrust collar 70 is formed substantially cylindrical and disposed to extend along the front-back direction. The shaft 10 is inserted through the thrust collar 70. The thrust collar 70 is fixed so that it cannot rotate relative to the shaft 10. The thrust bearing 90 is fitted onto a midway portion between front and back of the thrust collar 70. The thrust bearing 90 is disposed to be in contact with the bearing housing 40 at the back of the bearing part 41. In this way, the thrust bearing 90 receives an axial load applied to the shaft 10.

Next, the structure of the flow control valve 50 will be described with reference to FIG. 3 and FIGS. 4A and 4B.

The flow control valve 50 generally includes a valve body 110, a spool 120, and a spring 130.

The valve body 110 is a substantially cylindrical member. The valve body 110 is disposed inside the bearing housing 40 (midway portion of the oil supply passage 42) such that its longitudinal direction coincides with the right-left direction. In the valve body 110 are formed a sliding part 111, a first port 112, a second port 113, and an oil communication passage 114.

The sliding part 111 is a hole formed to extend inside the valve body 110 along the right-left direction. The sliding part 111 is formed to have a circular cross section. Both ends of the sliding part 111 are closed by closure members as required.

The first port 112 is a hole formed to communicate the sliding part 111 with the outside of the valve body 110. The first port 112 is formed at a position opposite the first oil supply passage 42a in the bearing housing 40.

The second port 113 is a hole formed to communicate the sliding part 111 with the outside of the valve body 110. The second port 113 is formed at a position opposite the second oil supply passage 42b in the bearing housing 40. The second port 113 is formed to have a diameter that is reduced (throttled) as required.

The oil communication passage 114 connects a midway portion between right and left, and a portion near the left end, of the sliding part 111 via the outside of the valve body 110. The oil communication passage 114 is formed by a first oil communication passage 114a, a second oil communication passage 114b, and a third oil communication passage 114c.

The first oil communication passage 114a is formed to communicate the sliding part 111 with the outside of the valve body 110 at a midway portion between right and left of the valve body 110. The first oil communication passage 114a is positioned on the right side of the first port 112.

The second oil communication passage 114b is a groove formed in an outer circumferential surface of the valve body 110. The second oil communication passage 114b extends from an outer end portion of the first oil communication passage 114a to near a left end portion of the valve body 110.

The third oil communication passage 114c is formed to communicate the sliding part 111 with the outside (near the left end portion of the second oil communication passage 114b) of the valve body 110 near the left end portion of the valve body 110. The third oil communication passage 114c is positioned on the left side of the first port 112.

The spool 120 is provided for throttling the flow passage of the lubricant flowing through the flow control valve 50 as required. The spool 120 is a substantially columnar member. The spool 120 is disposed inside the sliding part 111 of the valve body 110 such that its longitudinal direction coincides with the right-left direction. The spool 120 is formed with a first large-diameter part 121 and a second large-diameter part 122.

The first large-diameter part 121 is a portion where the diameter is larger than that of other portions. The first large-diameter part 121 is formed near a right end portion of the spool 120. The diameter (outer diameter) of the first large-diameter part 121 is formed to be substantially the same as the diameter (inner diameter) of the sliding part 111 of the valve body 110.

The second large-diameter part 122 is a portion where the diameter is larger than that of other portions. The second large-diameter part 122 is formed at a predetermined distance from the first large-diameter part 121 in a midway portion between right and left of the spool 120. The second large-diameter part 122 is positioned on the left side of the first oil communication passage 114a and on the right side of the third oil communication passage 114c of the valve body 110. The diameter (outer diameter) of the second large-diameter part 122 is formed to be substantially the same as the diameter (inner diameter) of the sliding part 111 of the valve body 110.

The second large-diameter part 122 is formed at a position opposite a portion of the first port 112 of the valve body 110. Specifically, the first port 112 is partly closed (throttled) by the second large-diameter part 122.

The first large-diameter part 121 and second large-diameter part 122 of the spool 120 configured as described above are in contact with the sliding part 111 of the valve body 110 so as to be slidable in the right-left direction, so that the spool 120 is disposed slidable in the right-left direction inside the sliding part 111 of the valve body 110. As the spool 120 slides in the right-left direction, the degree of closure (throttle opening) of the first port 112 in the valve body 110 by the second large-diameter part 122 varies.

The spring 130 is disposed on the right side of the spool 120 to urge the spool 120 leftward with a predetermined force.

In the flow control valve 50 configured as described above, a first oil chamber R1 that is filled with the lubricant is formed in the portion surrounded by the first large-diameter part 121 and second large-diameter part 122 of the spool 120 and the sliding part 111 of the valve body 110. A second oil chamber R2 that is filled with the lubricant is formed in the portion surrounded by the second large-diameter part 122 of the spool 120 and the sliding part 111 of the valve body 110.

The first oil chamber R1 and second oil chamber R2 are divided by the second large-diameter part 122 of the spool 120, and connected to each other by the oil communication passage 114.

Next, one form of feeding lubricant (how the lubricant is fed to the bearing part 41 and then discharged) will be described in specific terms with reference to FIG. 1 to FIG. 5B.

Figure 4A:
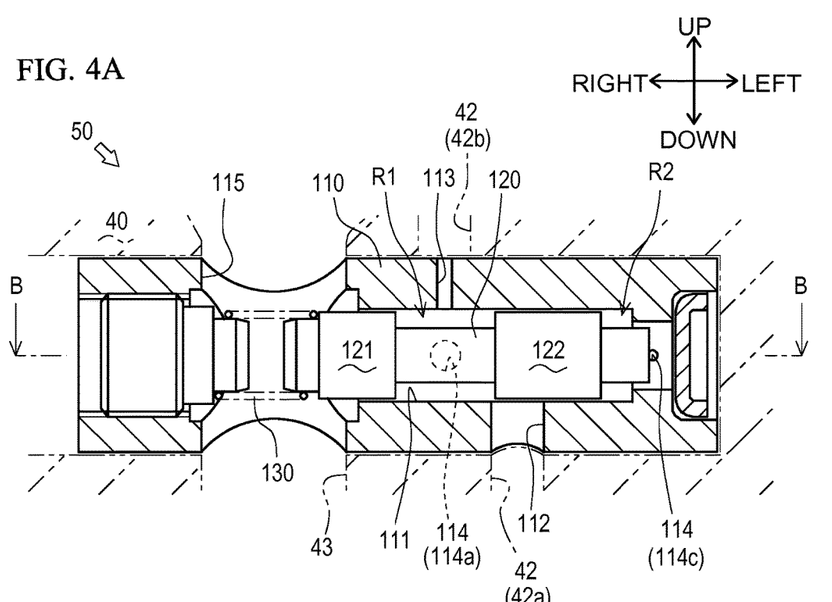
FIG. 4A is an enlarged view of a flow control valve of FIG. 3.
Figure 5A:
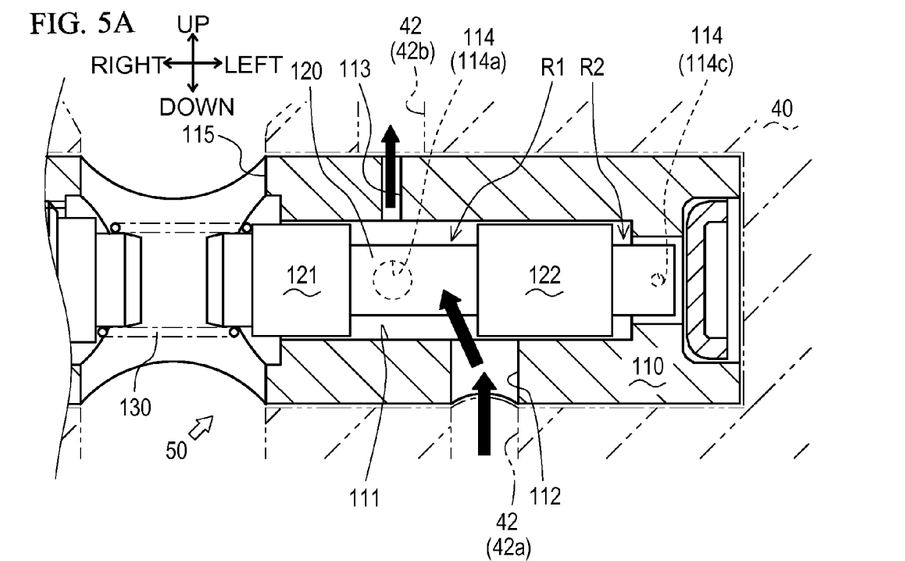
FIG. 5A is a diagram illustrating a state in which pressure in a first oil chamber has elevated.
Figure 5B:
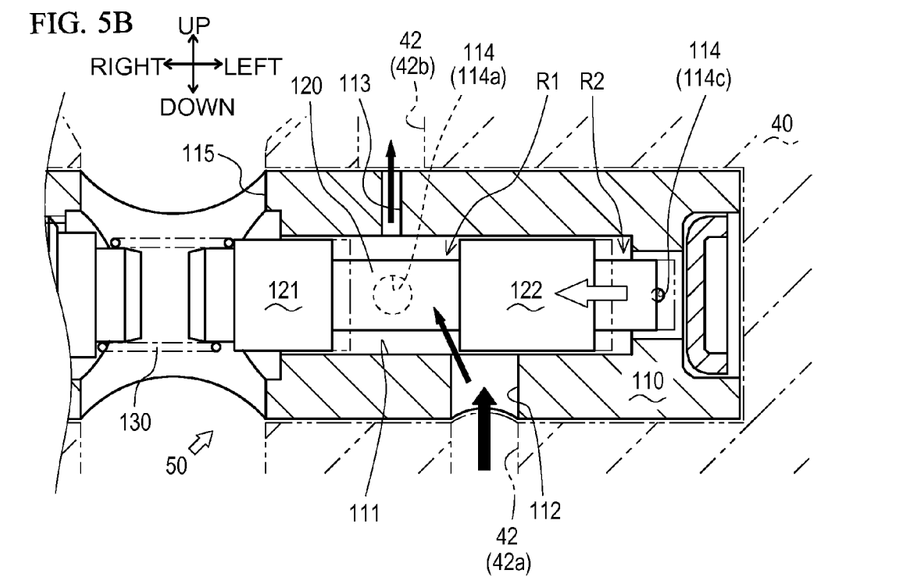
FIG. 5B is a diagram illustrating how the flow passage of the lubricant is throttled by the flow control valve.

As mentioned above, the lubricant that is fed under pressure by the oil pump 4 (see FIG. 1) is supplied into the first oil chamber R1 via the first oil supply passage 42a in the bearing housing 40 and the first port 112 of the valve body 110 (see FIG. 4A and FIGS. 5A and 5B). The lubricant in the first oil chamber R1 is fed to the second oil supply passage 42b in the bearing housing 40 via the second port 113. The amount of lubricant flowing through the second port 113 at this time changes in accordance with the difference between the pressure inside the first oil chamber R1 and the pressure inside the second oil supply passage 42b (pressure difference).

Figure 1:
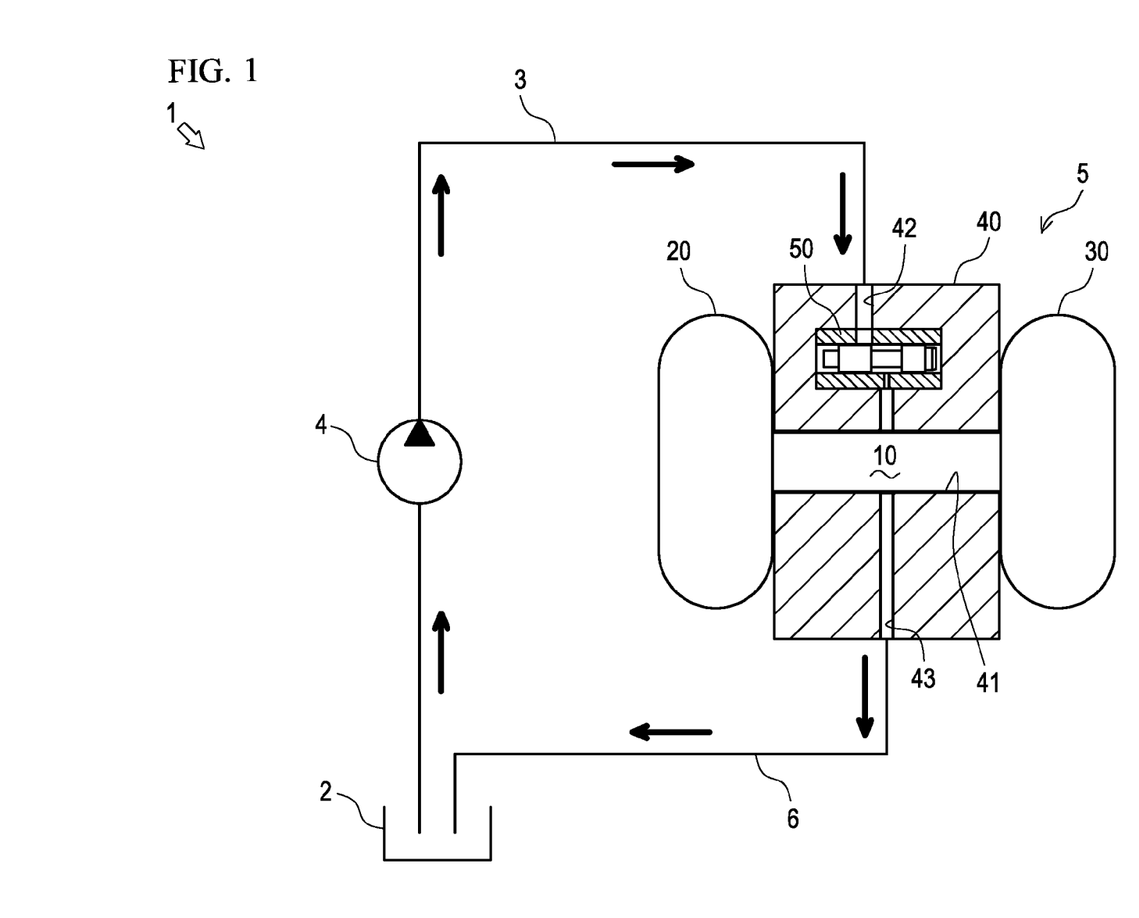
FIG. 1 is a schematic diagram illustrating the overall structure of a lubricant feed mechanism according to one embodiment of the present invention.
Figure 2:
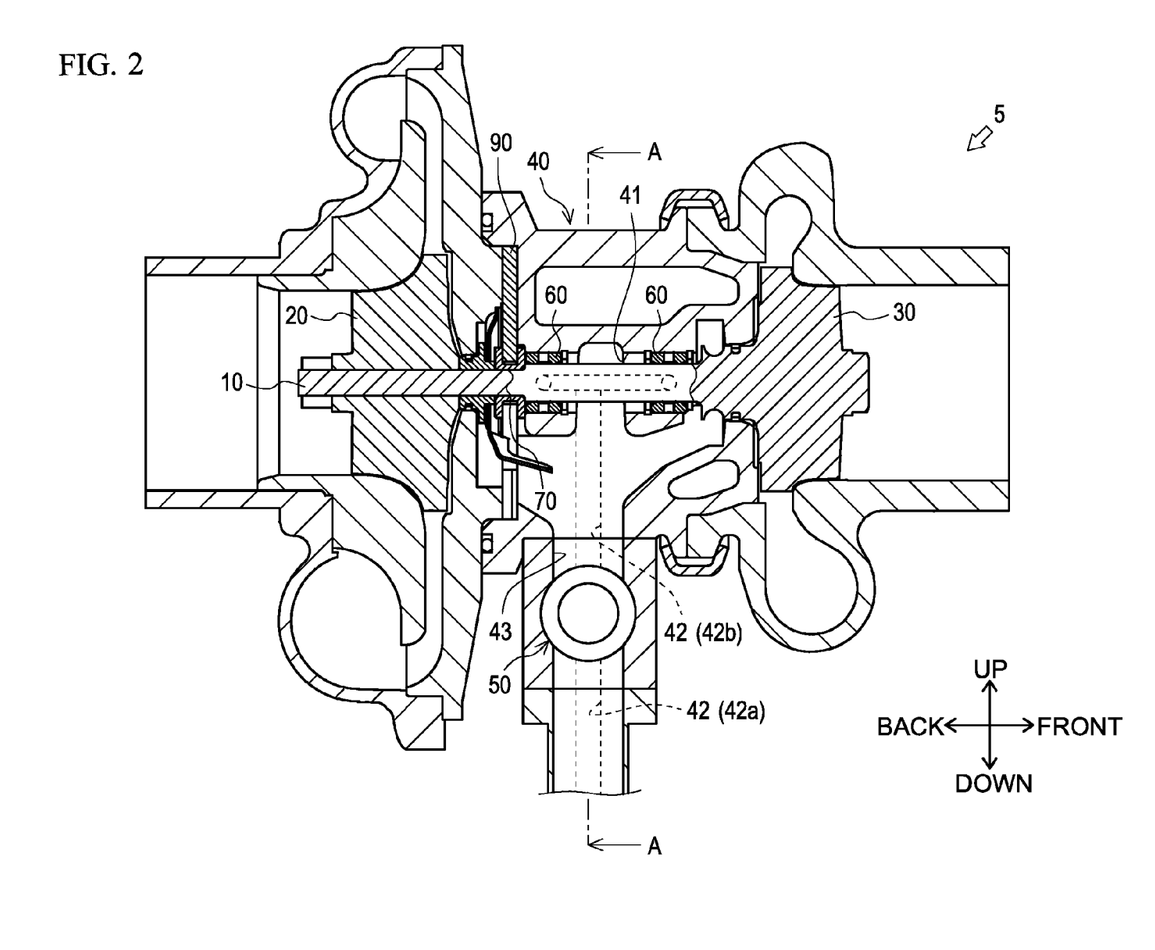
FIG. 2 is a side cross-sectional view illustrating the structure of a turbocharger.
Figure 3:
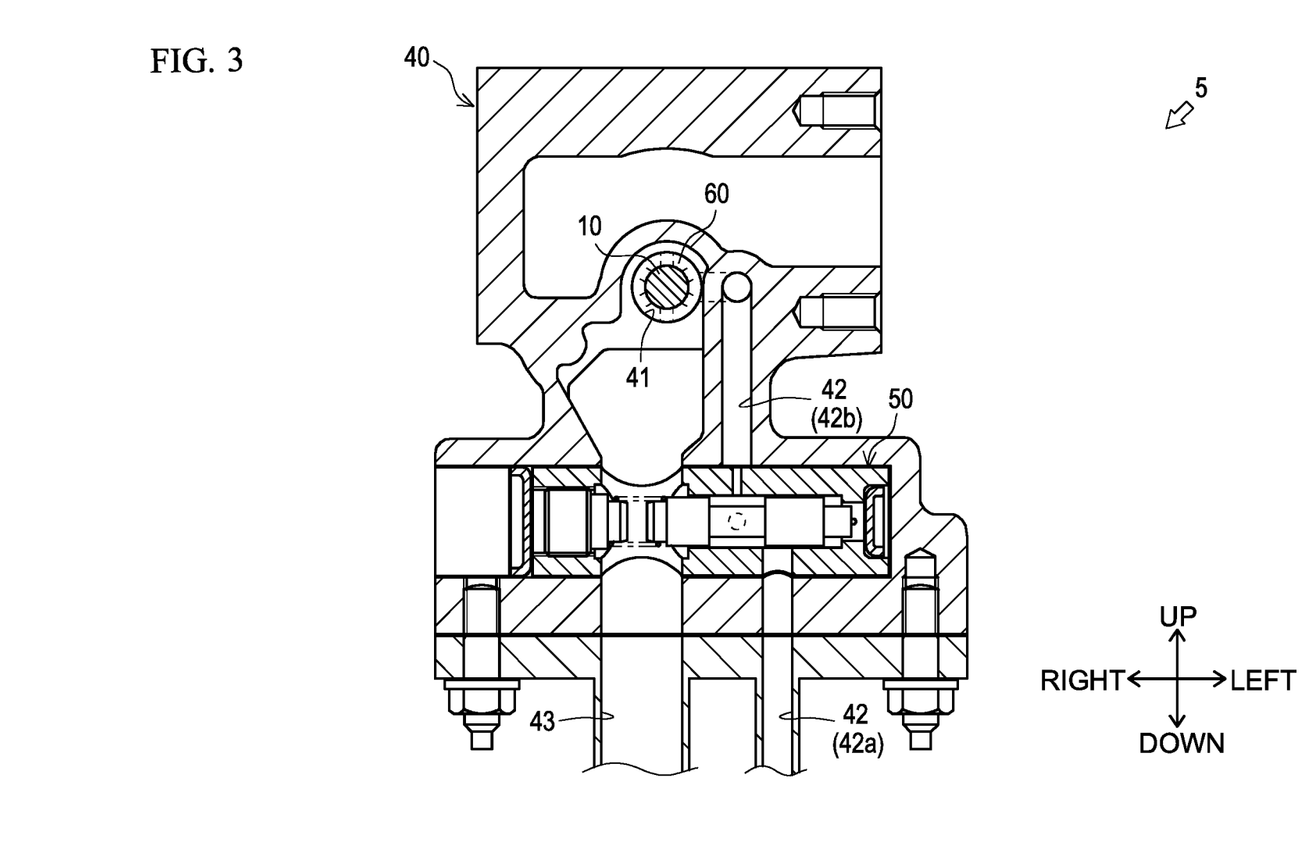
FIG. 3 is a cross-sectional view along A-A of FIG. 2.
Figure 4B:
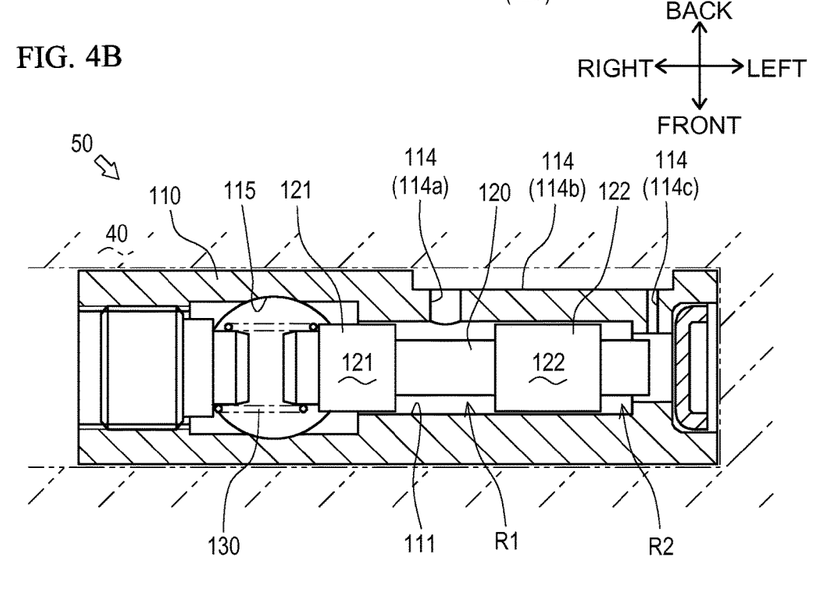
FIG. 4B is a cross-sectional view along B-B.

The lubricant fed to the second oil supply passage 42b is guided through the second oil supply passage 42b and supplied to the bearing part 41 of the bearing housing 40 (see FIG. 2 and FIG. 3). The lubricant fed to the bearing part 41 lubricates the bearing part 41 (in particular, sliding bearings 60), after which it flows out into the oil discharge passage 43 from the front end, rear end, and midway portion between front and back of the bearing part 41. The lubricant is then returned to the oil pan 2 (see FIG. 1) via the oil discharge passage 43 and return oil passage 6.

Next, how the amount of lubricant that is fed to the bearing part 41 is adjusted by the flow control valve 50 will be described with reference to FIGS. 5A and 5B.

As mentioned above, the amount of lubricant flowing through the second port 113 of the flow control valve 50 (i.e., the amount of lubricant that is fed to the bearing part 41) changes in accordance with the difference between the pressure inside the first oil chamber R1 and the pressure inside the second oil supply passage 42b (pressure difference). Therefore, this pressure difference is controlled to be substantially constant by means of the flow control valve 50 according to this embodiment. This will be explained more specifically below.

For example, when the engine rpm rises, the rpm of the oil pump 4 rises, too, so that the amount of lubricant fed to the first oil chamber R1 in the flow control valve 50 is increased, too. In this case, the pressure inside the first oil chamber R1 is elevated, so that the difference between the pressure in the first oil chamber R1 and the pressure in the second oil supply passage 42b (pressure difference) increases. Therefore, in this state, the amount of lubricant flowing through the second port 113 will increase as shown in FIG. 5A, and an excess amount of lubricant will be fed to the bearing part 41.

In the flow control valve 50 according to this embodiment, however, the first oil chamber R1 and the second oil chamber R2 are connected to each other via the oil communication passage 114, so that the pressure in the first oil chamber R1 propagates also to the second oil chamber R2. When the pressure in the second oil chamber R2 is elevated similarly to that of the first oil chamber R1, the spool 120 is pushed rightward by this pressure in the second oil chamber R2.

When the spool 120 is pushed rightward by the pressure in the second oil chamber R2, the spool 120 slides to the right side as far as to a position where the pressure and the urging force of the spring 130 balance each other, as shown in FIG. 5B.

When the spool 120 slides to the right side, the first port 112 (lubricant flow passage) is throttled even more by the second large-diameter part 122 of the spool 120. In this way, the amount of lubricant fed to the first oil chamber R1 is reduced, so that the pressure in the first oil chamber R1 is lowered.

As described above, when the pressure in the first oil chamber R1 rises, the lubricant flow passage is throttled by the flow control valve 50, whereby the pressure in the first oil chamber R1 is adjusted to reduce. In this way, the difference between the pressure in the first oil chamber R1 and the pressure in the second oil supply passage 42b (pressure difference) can be adjusted to be substantially constant.

On the other hand, when the pressure in the first oil chamber R1 lowers and the difference between the pressure in the first oil chamber R1 and the pressure in the second oil supply passage 42b (pressure difference) is reduced, the spool 120 slides to the left side by the urging force of the spring 130, in contrast to the case described above. In this way, the amount of lubricant fed to the first oil chamber R1 is increased, so that the pressure in the first oil chamber R1 can be elevated.

Selecting the urging force of the spring 130 as required allows for free setting of the difference between the pressure in the first oil chamber R1 and the pressure in the second oil supply passage 42b (pressure difference), which in turn allows for free setting of the amount of lubricant to be fed to the bearing part 41.

As described above, the lubricant feed mechanism 1 for the turbocharger 5 according to this embodiment, the mechanism of feeding lubricant to the bearing part 41 that rotatably supports the shaft 10 connecting the compressor wheel 20 and the turbine wheel 30, includes the oil supply passage 42 that guides the lubricant fed under pressure from the oil pump 4 to the bearing part 41, and the flow control valve 50 provided to the oil supply passage 42 for adjusting the amount of lubricant by throttling the flow passage of the lubricant based on the pressure of the lubricant flowing through the oil supply passage 42.

With this configuration, an excessive supply of lubricant to the bearing part 41 can be prevented without the need to release the lubricant, so that work of the oil pump 4 can be reduced. This enables a reduction in the size of the oil pump 4.

Moreover, since the flow control valve 50 can adjust the flow amount of the lubricant by itself, there is no need to provide an additional control device or the like, and so a cost reduction can be achieved.

The flow control valve 50 is provided in the bearing housing 40 where the bearing part 41 is formed.

With this configuration, the flow control valve 50 can be handled integrally with the bearing housing 40. This allows for space saving and facilitates assembling work.

Since the flow passage of the lubricant flowing through the oil supply passage 42 is throttled by the flow control valve 50 as described above, the temperature of the lubricant is raised by friction heat that is generated at sliding parts between the shaft 10 and the sliding bearings 60, between the sliding bearings 60 and the bearing part 41, and between the thrust collar 70 and the thrust bearing 90. With a temperature rise of the lubricant, the dynamic viscosity of the lubricant is lowered, so that friction torque in the sliding parts between the shaft 10 and the sliding bearings 60, between the sliding bearings 60 and the bearing part 41, and between the thrust collar 70 and the thrust bearing 90 can be reduced. A specific example of such reduction in the friction torque is shown in FIG. 7.

Figure 7:
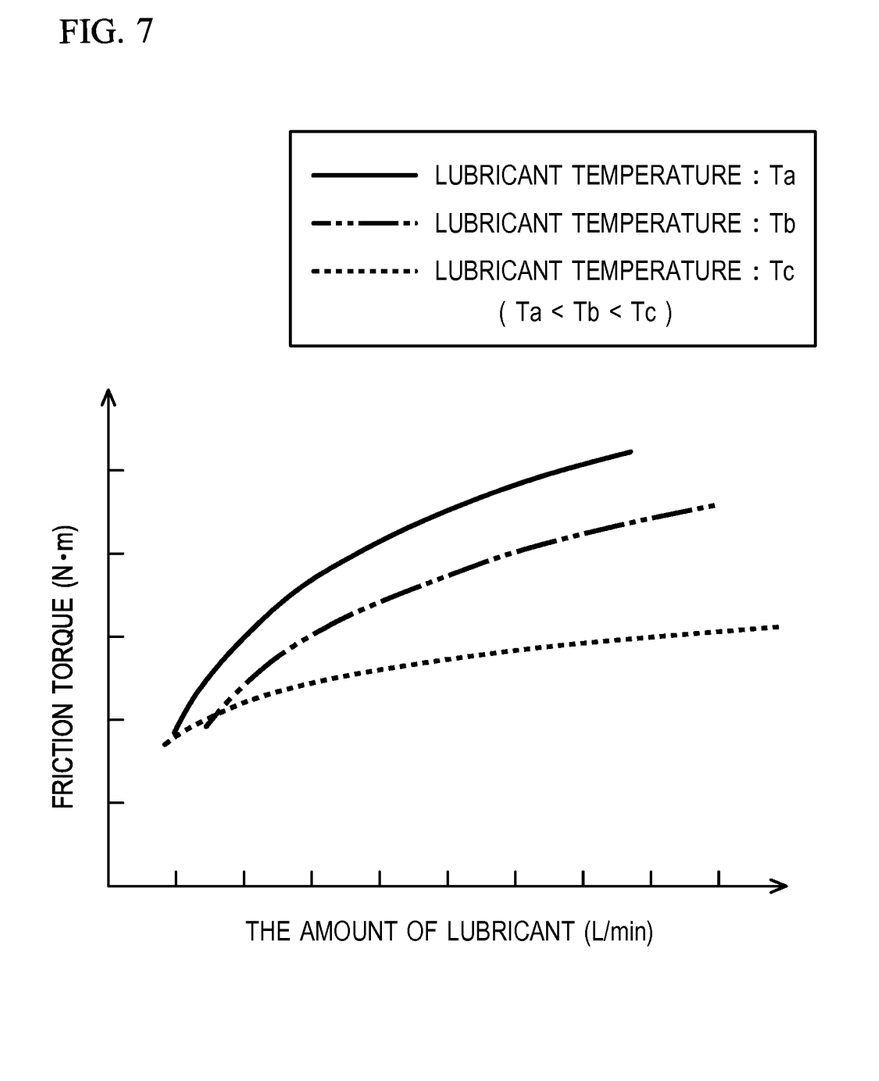
FIG. 7 is a chart illustrating the relationship between the amount of lubricant and the friction torque.
Figure 8:
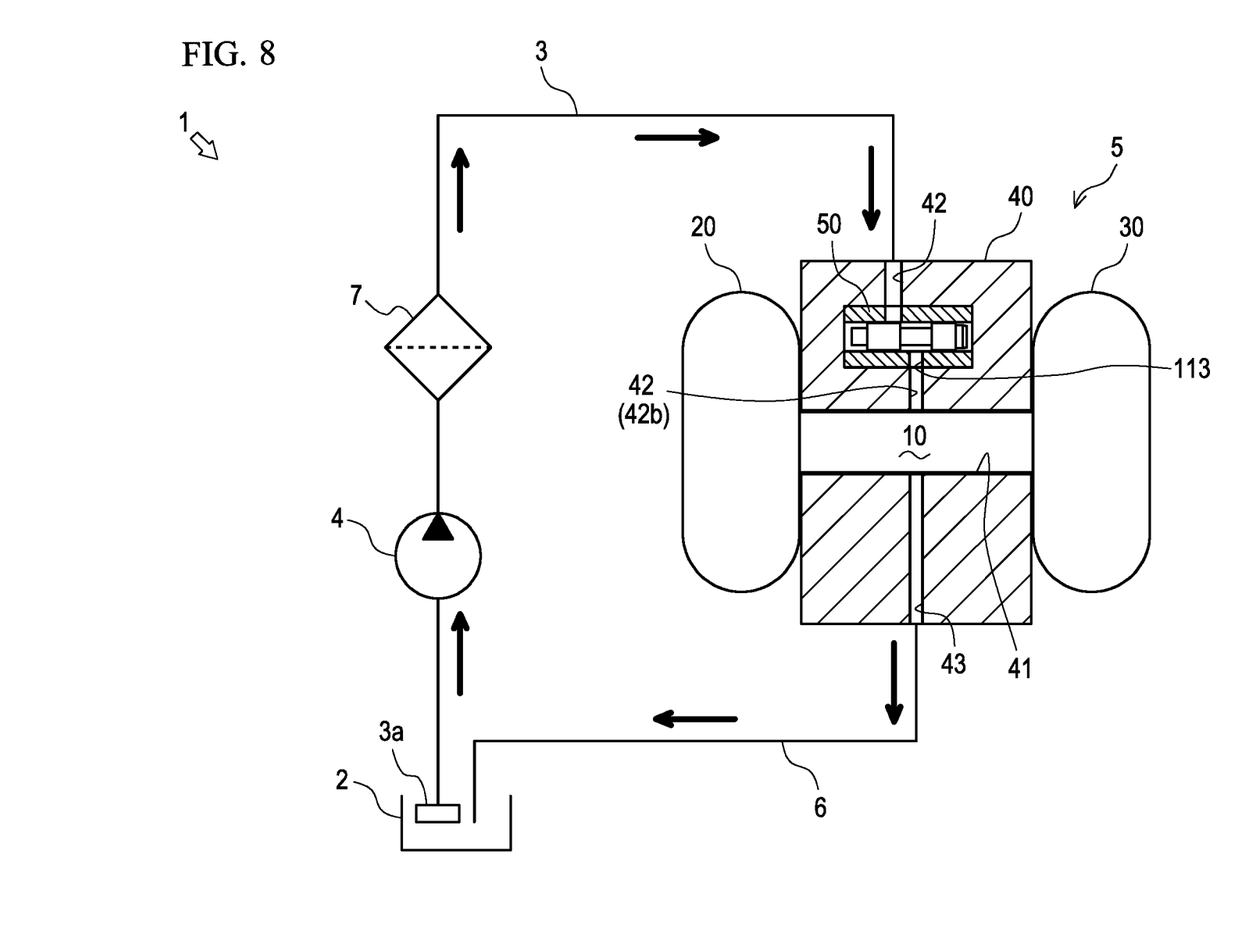
FIG. 8 is a schematic diagram illustrating the overall structure of a lubricant feed mechanism according to a variation example of the present invention.
Figure 9:
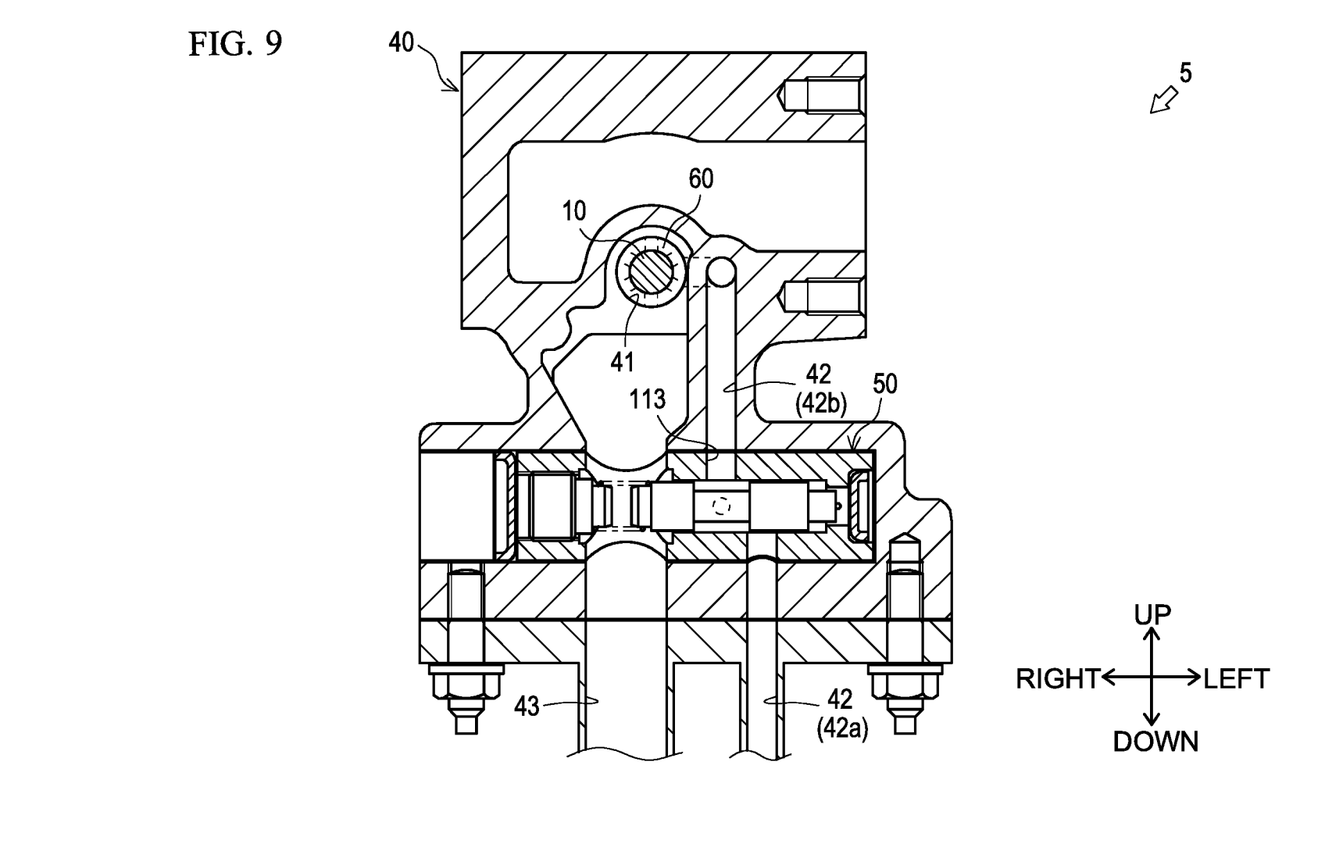
FIG. 9 is a front cross-sectional view of a turbocharger according to the variation example.
Figure 10A:
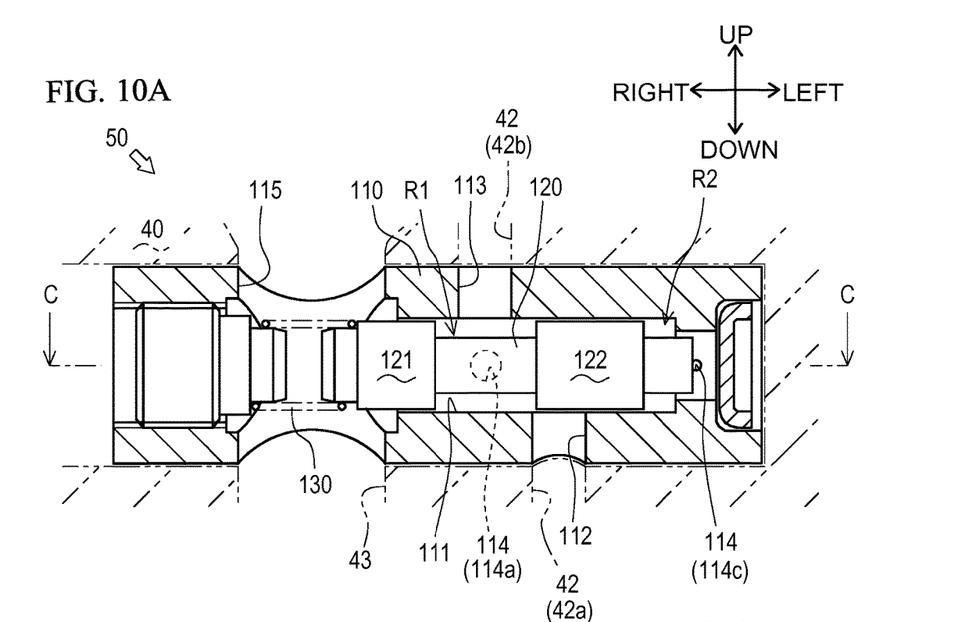
FIG. 10A is an enlarged view of a flow control valve according to the variation example.
Figure 10B:
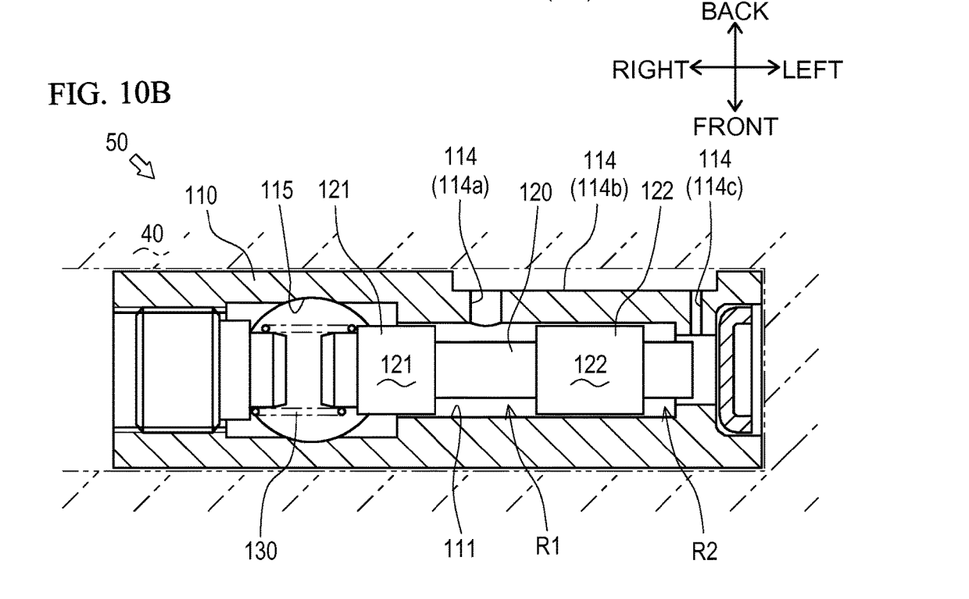
FIG. 10B is a cross-sectional view along C-C.

FIG. 7 shows the relationships between the amount of lubricant flowing through the flow control valve 50 and the friction torque in the sliding parts downstream of the valve when the temperatures of the lubricant stored in the oil pan 2 are Ta, Tb, and Tc (wherein Ta<Tb<Tc).

Normally, the lower the temperature of the lubricant, the higher the dynamic viscosity, and the friction torque is increased with that. Specifically, when the lubricant temperature is Ta, the friction torque is higher than it is when the lubricant temperature is Tb or Tc.

However, when the flow control valve 50 throttles the flow passage of the lubricant (when the lubricant amount decreases in FIG. 7), the lubricant temperature is raised by the friction heat that is generated at sliding parts between the shaft 10 and the sliding bearings 60, between the sliding bearings 60 and the bearing part 41, and between the thrust collar 70 and the thrust bearing 90, and therefore the friction torque in the sliding parts is reduced. When the amount of lubricant has reduced to a certain level, the difference in the friction torque between the lubricant temperatures Ta, Tb, and Tc is almost 0 (friction torque becomes substantially the same).

The friction torque in the sliding parts can be reduced in this way by throttling the lubricant flow passage with the use of the flow control valve 50. In particular, as shown in FIG.

7, the friction torque is about the same between the cases where the lubricant temperature is low (such as during the warm-up operation immediately after the engine is started) and where the lubricant temperature is high. In this way, the friction torque can be reduced even in a situation with a low lubricant temperature where the friction torque would normally be high. In addition, work of the oil pump 4 can be reduced, and fuel efficiency of the engine can be improved. At the same time, an excessive supply of lubricant to the bearing part 41 can be prevented.

In the valve body 110 of the flow control valve 50 in this embodiment, a spring chamber 115 is formed to dispose the spring 130 therein (see FIG. 4A to FIG. 5B). The spring chamber 115 is a through hole formed to extend through the valve body 110 along the up-down direction. The spring chamber 115 is formed at a position opposite the oil discharge passage 43 formed in the bearing housing 40, near the right end portion of the valve body 110. In this way, the spring chamber 115 is communicated with the oil discharge passage 43, so that the lubricant flowing through the oil discharge passage 43 passes through the spring chamber 115. The spring 130 is to be disposed in the spring chamber 115 thus configured.

As described above, the flow control valve 50 throttles the lubricant flow passage with the spool 120 slid by the urging force of the spring 130 from the right side and the force by the pressure in the second oil chamber R2 from the left side balancing each other. Therefore, the space on the right side of the spool 120, namely, the spring chamber 115, needs to be opened to the atmospheric pressure, so that no other forces (pressure) than that by the spring 130 will be applied from the right side.

In this embodiment, the spring chamber 115 is communicated with the oil discharge passage 43. The oil discharge passage 43 is an oil passage for discharging the lubricant and therefore opened to the atmospheric pressure. That is, in the flow control valve 50 according to this embodiment, the pressure in the spring chamber 115 is at the atmospheric level even without any structure for opening the spring chamber 115 to the atmospheric pressure.

As described above, the flow control valve 50 according to this embodiment does not require an additional structure for opening the spring chamber 115 to the atmospheric pressure (more specifically, a structure for communicating the spring chamber 115 with the outside, or a (sealing) structure for preventing leakage of the lubricant from the flow control valve 50), so that the overall size of the turbocharger 5 can be made smaller.

While the oil communication passage 114 communicates the first oil chamber R1 with the second oil chamber R2 via the outside of the valve body 110 in this embodiment, the present invention is not limited to this. The oil communication passage 114 need not necessarily pass the outside of the valve body 110 as long as it communicates the first oil chamber R1 with the second oil chamber R2. For example, the oil communication passage 114 can be formed inside the valve body 110, or can be formed in the spool 120.

Another embodiment (variation example) of the present invention will be described below with reference to FIG. 8 to FIG. 11.

In this variation example, the second port 113 in the flow control valve 50 is formed such that its diameter is not reduced but is substantially the same as the diameter of the opposite oil supply passage 42 (second oil supply passage 42b). In this case, clearances (such as a clearance between the bearing part 41 and the sliding bearings 60, and a clearance between the sliding bearings 60 and the shaft 10) in the bearing part 41 of the bearing housing 40 (see FIG. 2 and others) function as the throttle.

If configured as this variation example, the amount of lubricant flowing through the second port 113 (i.e., the amount of lubricant that is fed to the bearing part 41) changes in accordance with the difference between the pressure inside the first oil chamber R1 and the pressure inside the oil discharge passage 43 (pressure difference). Therefore, this pressure difference is controlled to be substantially constant by means of the flow control valve 50 according to this embodiment. This will be explained more specifically below.

Figure 11A:
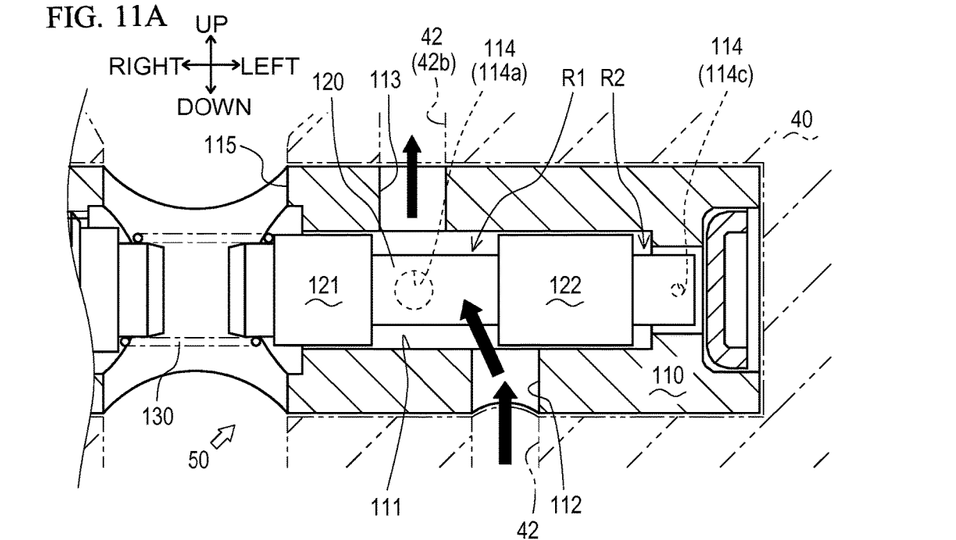
FIG. 11A is a diagram illustrating a state in which pressure in a first oil chamber has elevated in the variation example.

For example, when the engine rpm rises, the rpm of the oil pump 4 rises, too, so that the amount of lubricant fed to the first oil chamber R1 in the flow control valve 50 is increased, too. In this case, the pressure inside the first oil chamber R1 is elevated, so that the difference between the pressure in the first oil chamber R1 and the pressure in the oil discharge passage 43 (pressure difference) increases. Therefore, in this state, the amount of lubricant flowing through the second port 113 will increase as shown in FIG. 11A, and an excess amount of lubricant will be fed to the bearing part 41.

Figure 11B:
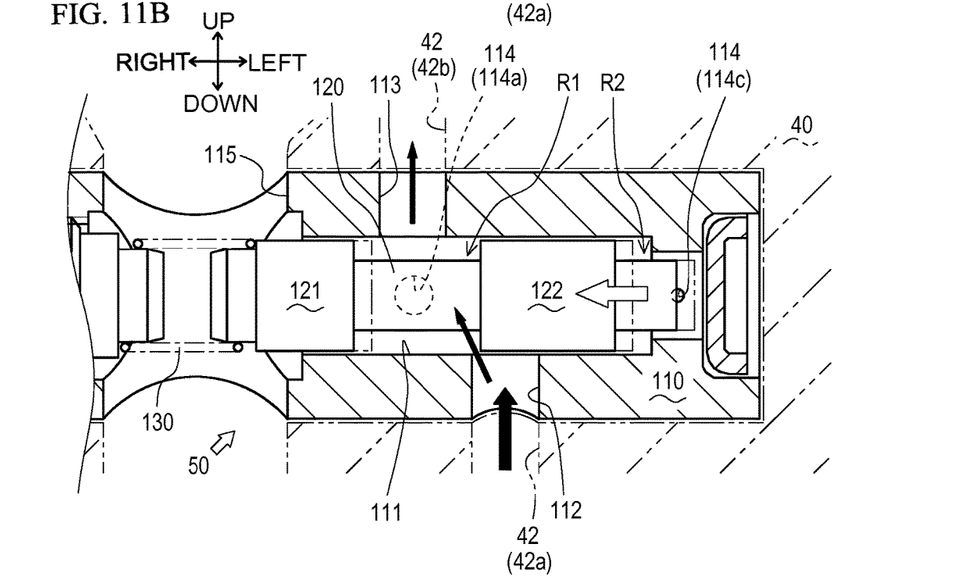
FIG. 11B is a diagram illustrating how the flow passage of the lubricant is throttled by the flow control valve in the variation example.

In the flow control valve 50 according to this variation example, however, the first oil chamber R1 and the second oil chamber R2 are connected to each other via the oil communication passage 114, so that the pressure in the first oil chamber R1 propagates also to the second oil chamber R2. When the pressure in the second oil chamber R2 is elevated similarly to that of the first oil chamber R1, the spool 120 is pushed rightward by this pressure in the second oil chamber R2.

When the spool 120 is pushed rightward by the pressure in the second oil chamber R2, the spool 120 slides to the right side as far as to a position where the pressure and the urging force of the spring 130 balance each other, as shown in FIG. 11B.

When the spool 120 slides to the right side, the first port 112 (lubricant flow passage) is throttled even more by the second large-diameter part 122 of the spool 120. In this way, the amount of lubricant fed to the first oil chamber R1 is reduced, so that the pressure in the first oil chamber R1 is lowered.

As described above, when the pressure in the first oil chamber R1 rises, the lubricant flow passage is throttled by the flow control valve 50, whereby the pressure in the first oil chamber R1 is adjusted to reduce. In this way, the difference between the pressure in the first oil chamber R1 and the pressure in the oil discharge passage 43 (pressure difference) can be adjusted to be substantially constant.

On the other hand, when the pressure in the first oil chamber R1 lowers and the difference between the pressure in the first oil chamber R1 and the pressure in the oil discharge passage 43 (pressure difference) is reduced, the spool 120 slides to the left side by the urging force of the spring 130, in contrast to the case described above. In this way, the amount of lubricant fed to the first oil chamber R1 is increased, so that the pressure in the first oil chamber R1 can be elevated.

Selecting the urging force of the spring 130 as required allows for free setting of the difference between the pressure in the first oil chamber R1 and the pressure in the oil discharge passage 43 (pressure difference), which in turn allows for free setting of the amount of lubricant to be fed to the bearing part 41.

Other possibilities include providing an oil strainer 3a at one end of the forced feed oil passage 3, or an oil filter 7 in a midway portion of the forced feed oil passage 3 (downstream of the oil pump 4), as shown in FIG. 1.

INDUSTRIAL APPLICABILITY

The present invention can be applied to a lubricant feed mechanism for a turbocharger, the mechanism of feeding lubricant to a bearing part that rotatably supports a shaft connecting a compressor wheel and a turbine wheel.

REFERENCE SIGNS LIST

1: Lubricant feed mechanism
4: Oil pump
5: Turbocharger
10: Shaft
20: Compressor wheel
30: Turbine wheel
40: Bearing housing
41: Bearing part
42: Oil supply passage
50: Flow control valve

The invention claimed is:
1. A lubricant feed mechanism for a turbocharger having a bearing part in a bearing housing that rotatably supports a shaft connecting a compressor wheel and a turbine wheel, the feed mechanism being configured to feed lubricant under pressure to the bearing part, the feed mechanism comprising:
   an oil supply passage that guides the lubricant fed under pressure from an oil pump to the bearing part;
   a flow control valve provided in the oil supply passage for adjusting an amount of the lubricant by throttling a flow passage of the lubricant, the flow control valve including:
      a valve body,
      a spool slidably arranged in the valve body,
      a spring chamber, and
      a spring arranged in the spring chamber and configured within the valve body so as to urge the spool in a first direction;
   the oil supply passage and the valve body being configured such that pressure in the oil supply passage urges the spool in a second direction opposite to the first direction;
   an oil discharge passage for discharging the lubricant from the bearing part, which oil discharge passage is opened to atmospheric pressure;
   wherein the flow control valve is provided in the bearing housing, and the spring chamber is communicated with the oil discharge passage so that the lubricant flowing through the oil discharge passage passes through the spring chamber.

* * * * *